United States Patent [19]

Budinski

[11] Patent Number: 4,683,768
[45] Date of Patent: Aug. 4, 1987

[54] TRANSMISSION RATIO SELECTOR
[75] Inventor: John A. Budinski, Jamestown, Ohio
[73] Assignee: General Motors Corporation, Detroit, Mich.
[21] Appl. No.: 862,467
[22] Filed: May 12, 1986
[51] Int. Cl.⁴ ............................................. F16H 57/10
[52] U.S. Cl. ..................................... 74/411.5; 74/436; 74/458
[58] Field of Search .............. 74/436, 458, 433, 411.5, 74/406, 435, 113, 335, 578

[56] References Cited
U.S. PATENT DOCUMENTS

| | | | |
|---|---|---|---|
| 2,392,320 | 1/1946 | Hegy | 74/436 |
| 2,589,486 | 3/1952 | Emrick | 74/436 |
| 3,236,116 | 2/1966 | Hafferkamp et al. | 74/436 |
| 4,033,494 | 7/1977 | Middleton et al. | 74/436 |
| 4,449,416 | 5/1984 | Huitema | 74/336 R |
| 4,570,765 | 2/1986 | Makita | 74/335 |

Primary Examiner—Cornelius J. Husar
Assistant Examiner—Peter M. Cuomo
Attorney, Agent, or Firm—Donald F. Scherer

[57] ABSTRACT

A transmission ratio selector actuator has a transmission ratio selector assembly including a selector shaft and a toothed gear segment secured thereto. The selector shaft is adapted to drive a conventional transmission detent sector plate or "rooster comb". The toothed segment meshes with a gear member which is formed integrally with or otherwise secured to a Geneva drive sector. A drive pin for the Geneva drive sector is secured to a worm wheel which is driven by a worm shaft integrally formed with or otherwise secured to an electric motor. A plurality of electrical control switches are actuated by the Geneva drive sector to control the operation of the motor and thereby provide for proper positioning of the selector shaft. The worm wheel has integral therewith a cam surface which is actuated upon by brake shoes to ensure stoppage of the drive pin during disengagement from the Geneva drive sector upon deactuation of the drive motor.

3 Claims, 4 Drawing Figures

TRANSMISSION RATIO SELECTOR

BACKGROUND OF THE INVENTION

This invention relates to transmission selector mechanisms and more particularly to selector mechanisms having electric motor drives.

The prior art devices, which utilize selector motor drives, generally operate directly on the manual shift valve and exclude the conventional "rooster comb". This, of course, requires the electric motor driven actuator to provide accurate positioning of the manual valve. While this is possible, it does require very close tolerances to be imposed upon the components utilized on the actuator mechanism.

SUMMARY OF THE INVENTION

The present invention utilizes the conventional internal workings (i.e., "rooster comb" or sector plate) of the commercially available transmission selectors. One such mechanism may be seen in U.S Pat. No. 2,943,501 issued to Stapleton July 5, 1960. By utilizing the conventional "rooster comb", the position of the manual valve is accomplished through the detent and spring mechanism associated with the "rooster comb". The actuator for driving the "rooster comb" or sector plate can be provided with less stringent manufacturing tolerances such that the detent positioning can be accomplished. In order to permit this detent positioning to occur within the transmission, the electric drive motor, through a Geneva drive arrangement, is effectively disconnected from the transmission selector shaft during the detent positioning of the "rooster comb" at various transmission positions thereby accommodating the slight rotary movements which may accompany the detent positioning. This allows the electric motor to decelerate and stop without effecting the detent positioning of the transmission selector.

It is therefore an object of this invention to provide an improved transmission ratio selector actuator having an electric motor drive and a selector shaft wherein the positioning force of the electric motor is disengaged from the selector shaft when the desired gear selection is achieved.

It is another object of this invention to provide an improved transmission ratio selector actuator having an electric motor driven Geneva mechanism wherein the drive pin of the Geneva mechanism is disengaged from the driven slot at all transmission ratio selection positions.

It is a further object of this invention to provide an improved transmission ratio selector actuator wherein an electric motor driven Geneva drive mechanism is operable to selectively actuate electric switching devices for controlling the operation of the motor to achieve the desired transmission selection and wherein a brake mechanism is operable to retard the input drive to the Geneva drive when the transmission selector is positioned at a transmission selection position and appropriate electric switches are actuated.

These and other objects and advantages of the present invention will be more apparent from the following description and drawings.

DETAILED DESCRIPTION OF THE DRAWINGS

DESCRIPTION OF THE PREFERRED EMBODIMENT

Figure 1:
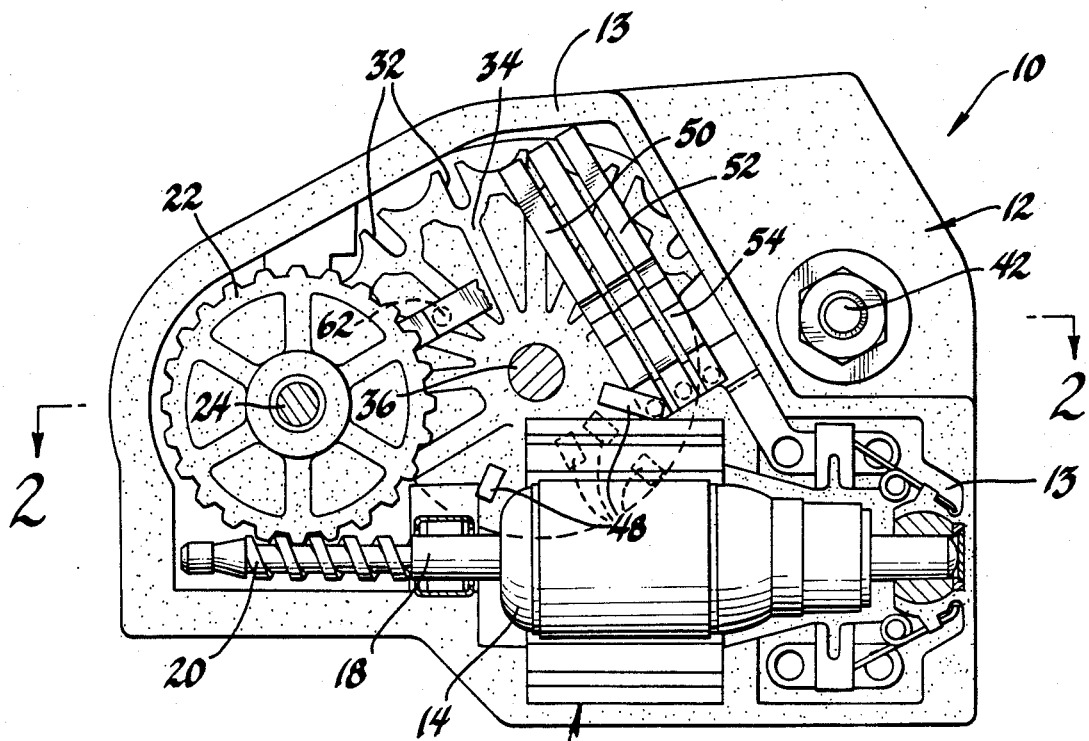
FIG. 1 is a side view of a transmission selector actuator incorporating the present invention.

Referring to the drawings, wherein like characters represent the same or corresponding parts throughout the several views, there is seen a transmission actuator assembly 10 having a housing assembly 12 adapted to be secured to a transmission case, not shown. The housing assembly 12 has a body portion 13 rotatably supporting an armature 14 of an electric motor, generally designated 16. The electric motor 16 is capable of rotating in either direction. The armature 14 has an output shaft 18 on which is integrally formed or otherwise secured thereto a worm member 20.

A worm wheel 22 meshes with the worm 20 and is rotatably supported on a shaft 24 which is secured in a pair of cover members 26 and 28 attached to the body 13 and forming part of the housing assembly 12. The worm wheel 22 has secured thereto and axially extending therefrom a drive pin 30. The drive pin 30 extends parallel to and is radially displaced from the shaft 24.

Figure 2:
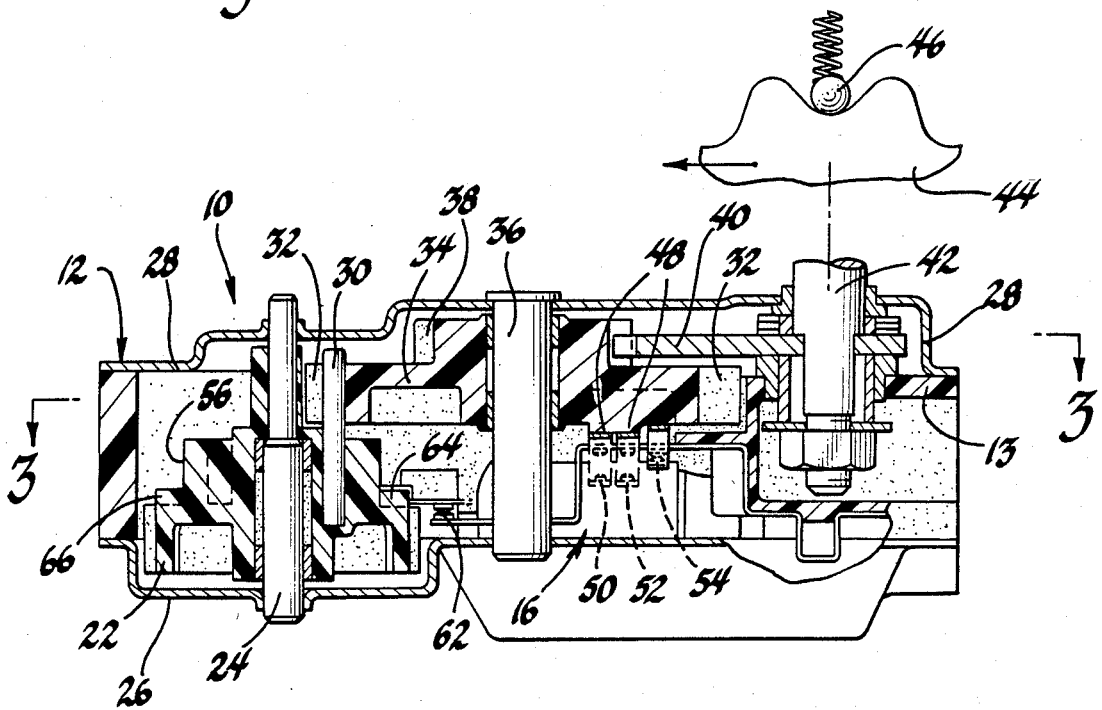
FIG. 2 is a view taken along line 2—2 of FIG. 1.

The pin 30 is adapted to engage a plurality of drive slots 32 which are formed on a Geneva sector 34. The covers 26 and 28 support a pin or shaft 36 which, in turn, rotatably supports the Geneva sector 34. A gear member 38 is formed integrally with or otherwise secured to the Geneva sector 34. The gear member 38 meshes with a gear sector 40 which is secured to a transmission ratio selector shaft 42 which is rotatably mounted in the body portion of housing assembly 12 and the cover 28. The transmission selector shaft is adapted to be connected to a conventional transmission detent sector plate or "rooster comb" in a conventional and well-known manner. Such a sector plate is shown diagrammatically as 44 in FIG. 2.

As is well-known, such sector plates are positioned by a spring loaded detent member such as that shown at 46. A hydraulic control valve, not shown, is operatively connected to the plate 44 for linear movement.

The Geneva sector 34 has formed thereon a plurality of cam surfaces 48 which are adapted to actuate electric switches shown as reed switches 50, 52, and 54. These switches will, of course, be actuated to opened and closed positions depending upon the position of cam surfaces 48.

It will therefore be appreciated that the switches 50, 52 and 54 can be individually actuated or actuated in combination during the rotation of the Geneva sector 34. These switches cooperate with manually selected switches, not shown, normally disposed near the operator in the vehicle to energize the electrical circuit for the electric motor 16 thereby controlling the operation thereof. These types of electrical switching systems are well-known such that further description is not believed necessary. Suffice it to say, if the operator should manually select a transmission drive position, for example, neutral, the electric motor 16 would be placed in rotary motion thereby causing rotation of the Geneva sector 34. When the Geneva sector 34 reaches the neutral position, the appropriate reed switches 50, 52 and/or 54 are actuated to discontinue the operation of the electric motor.

Figure 3:
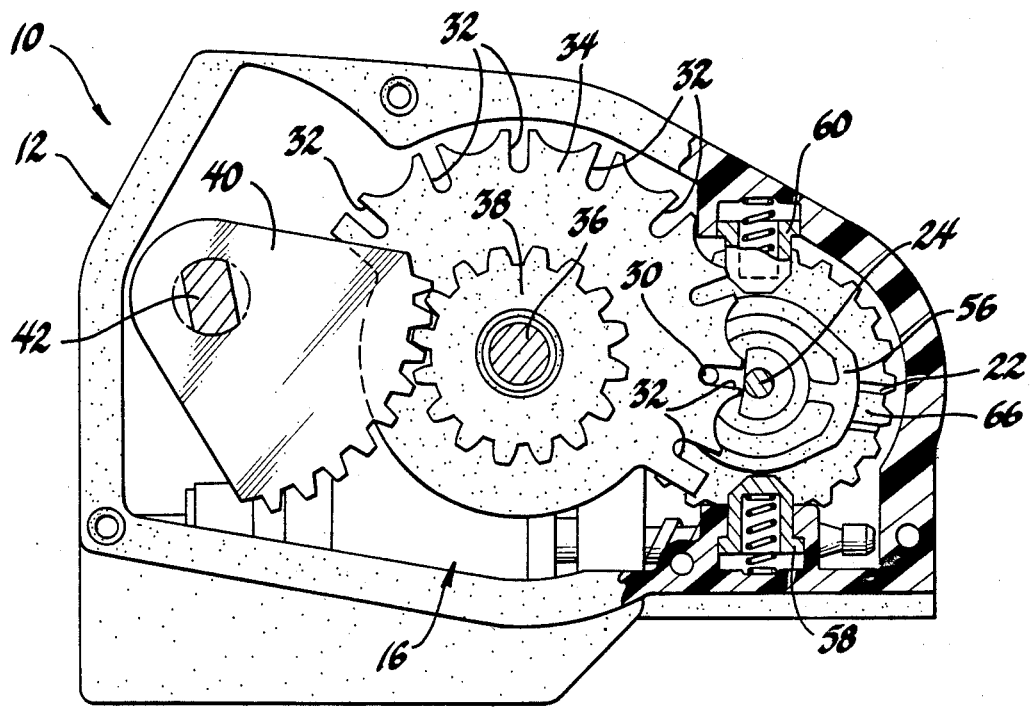
FIG. 3 is a view taken along line 3—3 of FIG. 2 showing the mechanism in one operating position.
Figure 4:
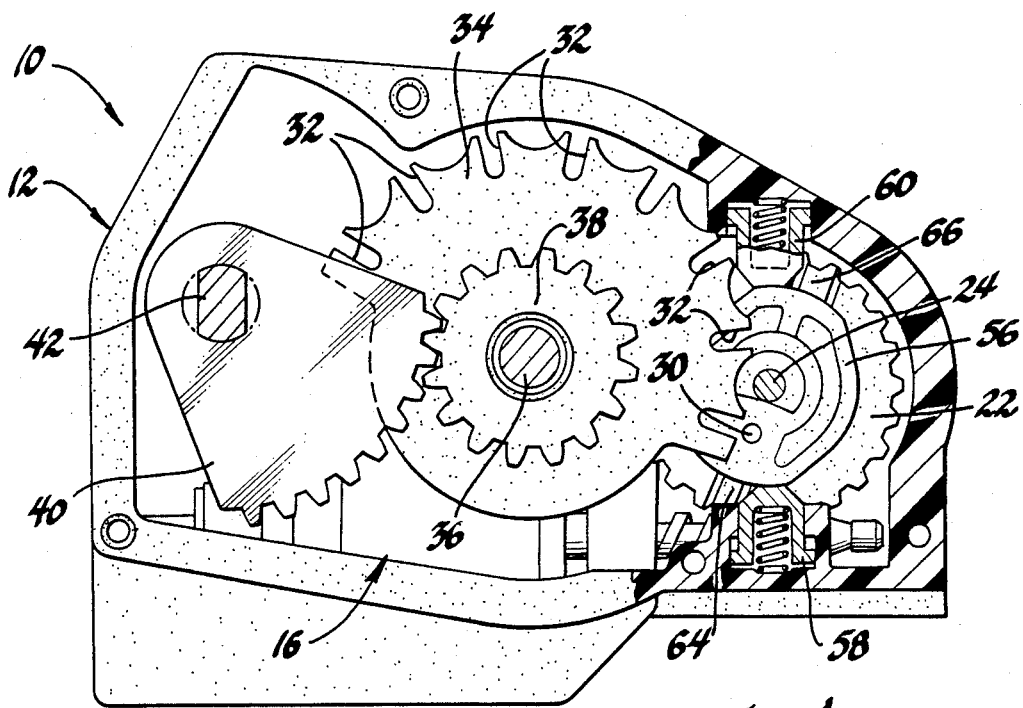
FIG. 4 is a view similar to FIG. 3 showing the mechanism in another operating position.

The worm wheel 22, as best seen in FIGS. 3 and 4, has integrally formed thereon or otherwise secured thereto, a two-lobed cam 56. This cam 56 has the outer surface thereof disposed for engagement by a pair of spring loaded friction shoes 58 and 60. These shoes 58 and 60 are designed to permit relatively free rotation of the cam 56 whenever the drive pin 30 is engaged in any of the drive slots 32, as seen in FIG. 3. However, whenever the drive pin 30 disengages a drive slot 32, the friction shoes 58 and 60 are operable to frictionally engage the cam 56 and retard rotation of the worm wheel 22. Since the worm wheel 22 is directly connected to the electric motor 16, the inertial energy of the electric motor 16 will be absorbed by the friction shoes 58 and 60 to cause stoppage of the worm wheel 22 whenever the electric motor 16 is deenergized.

As previously mentioned, the reed switches 50, 52 and 54 and cam surfaces 48 are placed to be operable when the drive pin 30 is disengaged from a drive slot 32. Therefore, in accordance with the present invention, the electric motor is only deenergized when the pin 30 is disengaged and the friction shoes 58 and 60 assist in stoppage of the electric motor prior to reengagement of the pin 30.

With the pin 30 disengaged from the drive slot 32, the gear sector 40 and Geneva sector 34 are substantially freely rotatable such that the detent mechanism 46 can provide proper positioning of the sector plate 44 thus permitting establishment of the desired ratio within the transmission. As will be appreciated, this permits the manufacturing tolerances on the Geneva sector 34, gear member 38 and gear sector 40 to be increased thereby decreasing the cost of manufacture.

An electrical switch 62 is disposed to be actuated by a pair of ramps 64 and 66 formed on the worm wheel 22. This electrical switch 62 can be utilized as a transmission position indicating switch or an end of travel switch thereby preventing overtravel of the Geneva sector 34 in either direction of operation in the unlikely event that the electric motor 16 should continue to run after a transmission selection has been made.

The present invention has been constructed substantially as shown and utilized with a conventional transmission sector plate in a conventional transmission. Tests have shown that the actuator can operate from one extreme of the selector shift pattern, for example, "Park", to the other extreme, for example, "Low" and back to "Park" in approximately two seconds. The same system has been found to be operable from "Reverse" to "Low" to "Reverse" in approximately one second. This timing is not significantly different from the timing which might be achieved through conventional manual manipulation of the transmission shift lever.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A transmission selector actuator for setting a transmission selector shaft to a desired transmission selector position chosen from a plurality of positions including Park, Reverse, Neutral and Drive, said actuator comprising: a housing; an electric motor; a worm driven by said motor; a worm wheel driven by said worm including a drive pin secured thereto and extending axially therefrom; a Geneva sector having a plurality of radial drive slots disposed thereon which are alignable with said drive pin to be engaged and driven thereby; a gear member integral and coaxial with said Geneva sector; a transmission selector assembly including a shaft and toothed segment which meshes with said gear member for rotation thereby to rotatably position said shaft to a plurality of transmission selected positions; brake means for selectively stopping said worm wheel and electrical switch means operatively connected with said Geneva sector and said electric motor to selectively start and stop said electric motor at the desired transmission selector positon, said switch means being spaced to signal for motor stoppage and for brake selection when said drive pin is disengaged from said drive slots.

2. A transmission selector actuator for setting a transmission selector shaft to a desired transmission selector position chosen from a plurality of positions including Park, Reverse, Neutral and Drive, said actuator comprising: a housing; an electric motor; a worm driven by said motor; a worm wheel driven by said worm including a drive pin secured thereto and extending axially therefrom; a Geneva sector having a plurality of radial drive slots disposed thereon which are alignable with said drive pin to be engaged and driven thereby; a gear member integral and coaxial with said Geneva sector; a transmission selector assembly including a shaft and toothed segment which meshes with said gear member for rotation thereby to rotatably position said shaft to a plurality of transmission selected positions; electrical switch means operatively connected with said Geneva sector and said electric motor to selectively start and stop said electric motor at the desired transmission selector position, said switch means being spaced to signal for motor stoppage when said drive pin is disengaged from said drive slots; cam means disposed on said worm wheel; and friction brake means disposed to engage said cam means when said drive pin is disengaged from said Geneva sector drive slots.

3. A transmission selector actuator for setting a transmission selector shaft to a desired transmission selector position chosen from a plurality of positions including Park, Reverse, Neutral and Drive, said actuator comprising: a housing; an electric motor; a worm driven by said motor; a worm wheel driven by said worm including a drive pin secured thereto and extending axially therefrom; a Geneva sector having a plurality of radial drive slots disposed thereon which are alignable with said drive pin to be engaged and driven thereby; a gear member integral and coaxial with said Geneva sector; a transmission selector assembly including a shaft and toothed segment which meshes with said gear member for rotation thereby to rotatably position said shaft to a plurality of transmission selected positions; electrical switch means operatively connected with said Geneva sector and said electric motor to selectively start and stop said electric motor at the desired transmission selector position, said switch means being spaced to signal for motor stoppage when said drive pin is disengaged from said drive slots; and brake means for stopping said electric motor when said drive pin is disengaged from said drive slots and the desired transmission selector position has been achieved.

\* \* \* \* \*